(12) United States Patent
Chen

(10) Patent No.: US 7,916,464 B2
(45) Date of Patent: Mar. 29, 2011

(54) FIXTURE MECHANISM

(75) Inventor: Po-Nine Chen, Taipei (TW)

(73) Assignees: Silitek Electronic (Guangzhou) Co. Ltd., Guangzhou (CN); Lite-On Technology Corp., Neihu Taipei (TW)

( * ) Notice: Subject to any disclaimer, the term of this patent is extended or adjusted under 35 U.S.C. 154(b) by 257 days.

(21) Appl. No.: 12/230,195

(22) Filed: Aug. 26, 2008

(65) Prior Publication Data

US 2009/0241608 A1 Oct. 1, 2009

(30) Foreign Application Priority Data

Mar. 25, 2008 (CN) .............................. 2008 1 027084

(51) Int. Cl.
*G06F 1/16* (2006.01)
*H05K 7/16* (2006.01)
*A47B 81/00* (2006.01)
*A47F 7/00* (2006.01)

(52) U.S. Cl. ................ 361/679.33; 361/726; 312/223.2; 211/26

(58) Field of Classification Search .......... 361/679.01–679.45, 679.55–679.59, 361/724–727, 679.31–679.4; 312/223.1, 223.2; 211/26

See application file for complete search history.

(56) References Cited

U.S. PATENT DOCUMENTS

| 6,999,307 | B2 * | 2/2006 | Peng .......................... 361/679.37 |
| 2007/0019377 | A1 * | 1/2007 | Chen et al. ..................... 361/685 |

* cited by examiner

*Primary Examiner* — Jayprakash N Gandhi
*Assistant Examiner* — Nidhi Desai
(74) *Attorney, Agent, or Firm* — Rosenberg, Klein & Lee

(57) ABSTRACT

A fixture mechanism is adapted to secure a computer hardware device onto a base plate, and includes a first limiting member, a second limiting member, a positioning mechanism, and an interfering member provided on the computer hardware device. The first limiting member is adapted to be secured onto the base plate, and includes an upright wall provided with a slot. The second limiting member is adapted to be disposed on the base plate, is movable relative to the first limiting member between locking and released positions, and is provided with a limiting groove that cooperates with the slot. When the second limiting member is at the released position, the slot is communicated with the limiting groove to permit free sliding movement of the interfering member along the slot. When the second limiting member is at the locking position, the slot is partly communicated with the limiting groove to thereby limit the interfering member.

8 Claims, 5 Drawing Sheets

FIXTURE MECHANISM

CROSS-REFERENCE TO RELATED APPLICATION

This application claims priority of Chinese Patent Application No. 200810027084.2, filed on Mar. 25, 2008.

BACKGROUND OF THE INVENTION

1. Field of the Invention

The invention relates to a fixture mechanism for fixing a computer hardware device in a housing, more particularly to a fixture mechanism that permits quick positioning and easy removal of a computer hardware device.

2. Description of the Related Art

Hardware devices of a computer generally include components such as a motherboard, various interface cards, a floppy disk drive, a hard disk, an optical disk drive, and disk drives. These components are often installed in a computer housing. Since components such as the floppy disk drive, the hard disk, the optical disk drive, etc., may be selectively installed, in order to facilitate installation and to permit subsequent expansion, mounting frames for mounting the floppy disk drive, the hard disk, the optical disk drive, etc., are generally provided in the computer housing in advance to enable the user to install/remove or to expand the floppy disk drive, the hard disk, the optical disk drive, etc., through the mounting frames.

A current method of securing a computer hardware device generally involves fixing a mounting frame in a computer housing with the use of screws, and fastening the computer hardware device to the mounting frame with the use of screws, thereby achieving the objective of fixing the computer hardware device in the computer housing. However, there are a number of disadvantages associated with such a fixing method. For example, when assembling the hardware device, operators on a production line have to power on a screwdriver intermittently to perform screw driving operations. Moreover, some of the screws need to be loosened during disassembly. The process is therefore complicated and laborious.

SUMMARY OF THE INVENTION

Therefore, an object of the present invention is to provide a fixture mechanism for quick installation or removal of a computer hardware device.

Accordingly, the fixture mechanism of the present invention is adapted to secure a computer hardware device onto a base plate, and includes: a first limiting member, a second limiting member, a positioning mechanism, and an interfering member. The first limiting member is adapted to be secured onto the base plate, and includes an upright wall, and a slot provided in the upright wall. The slot has a transverse segment that is to be disposed generally parallel to the base plate, and an oblique segment that extends obliquely upward from one end of the transverse segment to a top side of the upright wall. The second limiting member is adapted to be disposed on the base plate, is movable relative to the first limiting member between a locking position and a released position, and is provided with a limiting groove that cooperates with the slot. The positioning mechanism selectively secures the second limiting member at one of the locking and released positions. The interfering member is adapted to be disposed on the computer hardware device, is extendible through the slot, and is slidable along the oblique segment and the transverse segment.

When the second limiting member is at the released position, the slot is communicated with the limiting groove to permit free sliding movement of the interfering member along the slot. When the second limiting member is at the locking position, the slot is partly communicated with the limiting groove, and a wall surface of the second limiting member which defines the limiting groove abuts against the interfering member, and cooperates with the transverse segment of the slot to limit the interfering member.

The fixture mechanism of this invention utilizes the second limiting member that is movable relative to the first limiting member between the locking and released positions to limit or release the interfering member (such as a screw) on the computer hardware device so that the computer hardware device can be quickly installed and positioned, and can be easily removed without loosening the interfering member, thereby enhancing work efficiency.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
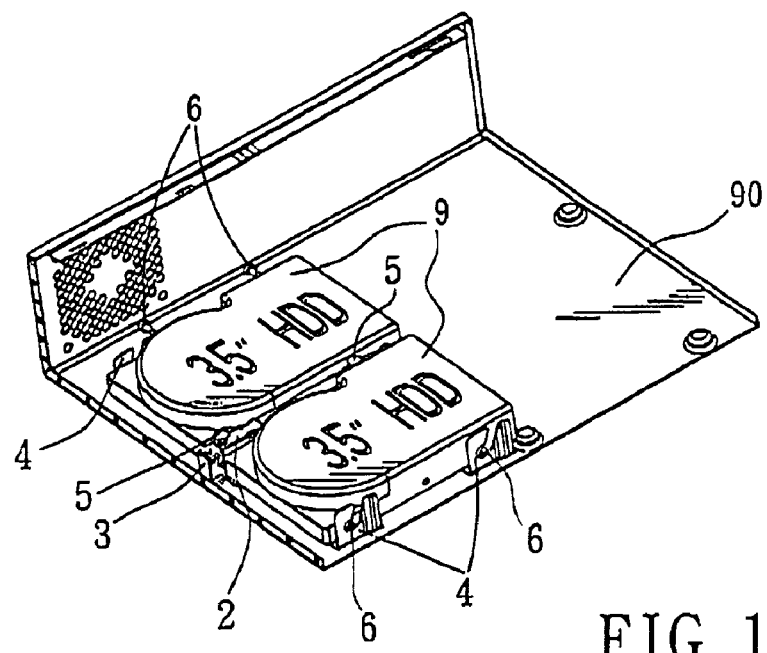
FIG. 1 is a perspective view of a preferred embodiment of a fixture mechanism according to the present invention.
Figure 2:
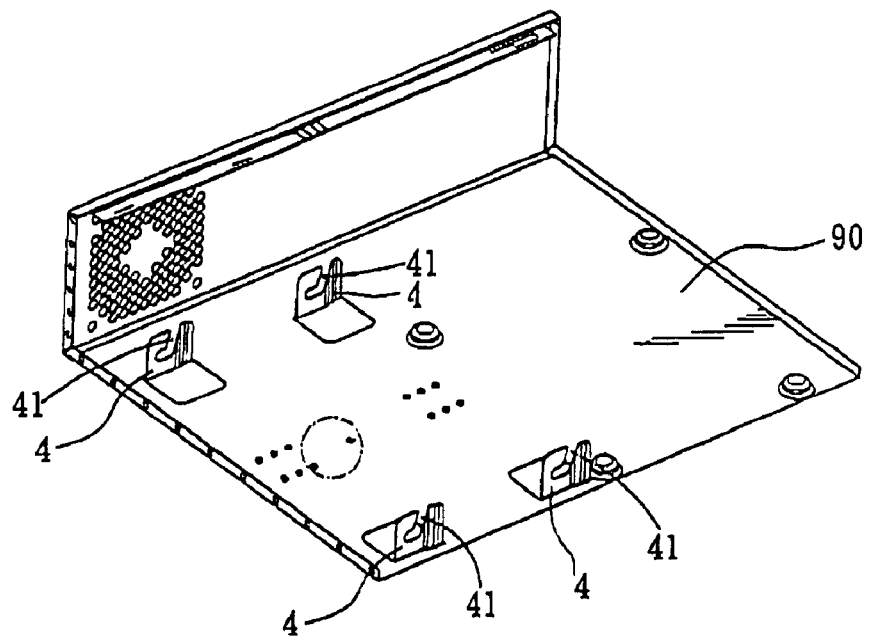
FIG. 2 is a perspective view to illustrate third limiting members of the preferred embodiment.
Figure 3:
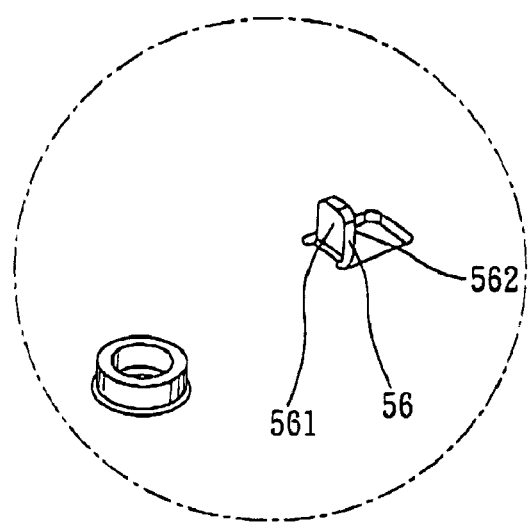
FIG. 3 is a fragmentary enlarged view to illustrate a stop element of the preferred embodiment.
Figure 4:
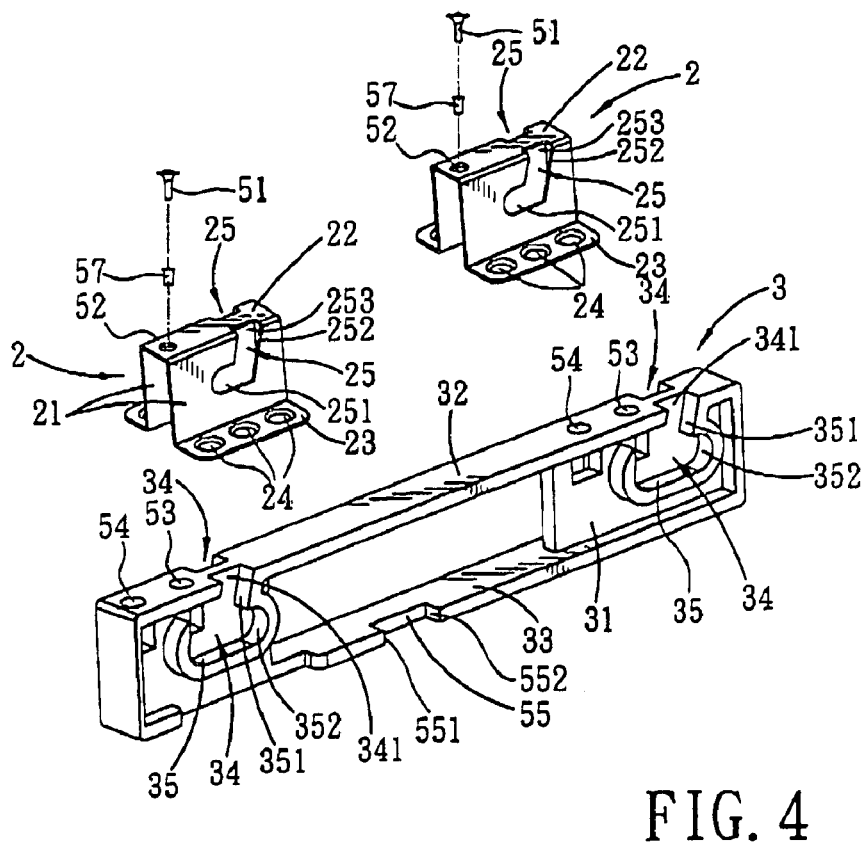
FIG. 4 is an exploded perspective view to illustrate two first limiting members and a second limiting member of the preferred embodiment.
Figure 5:
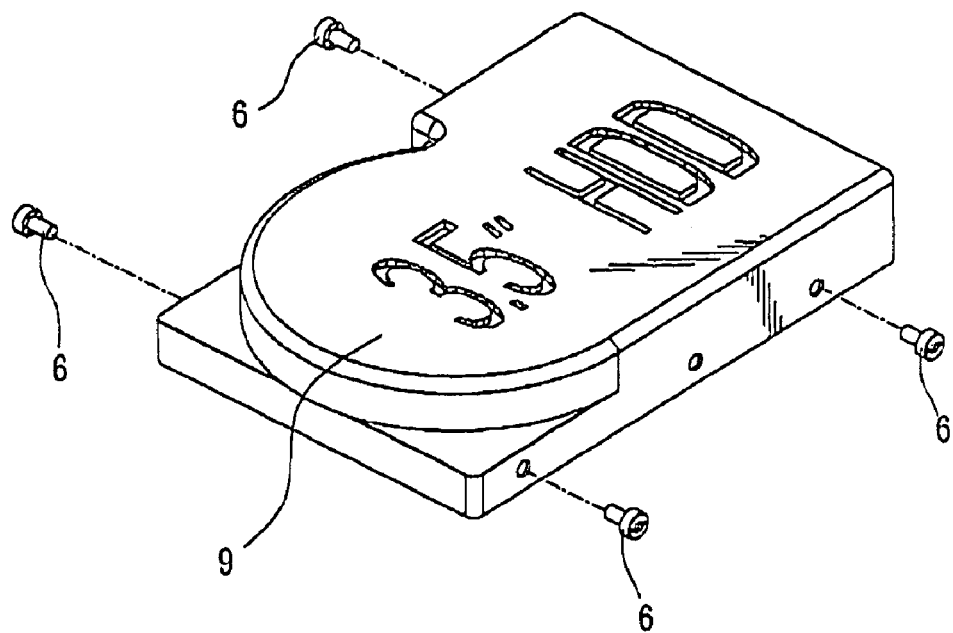
FIG. 5 is an exploded perspective view to illustrate four interfering members of the preferred embodiment and a computer hardware device.

Referring to FIGS. 1 to 5, the preferred embodiment of a fixture mechanism 1 according to the present invention is adapted to secure two computer hardware devices 9 onto a base plate 90. The fixture mechanism 1 includes two first limiting members 2, a second limiting member 3, four third limiting members 4, two positioning mechanisms 5, and eight interfering members 6. As shown in FIG. 5, the interfering members 6 are screws, which are respectively screwed into the computer hardware devices 9. Each computer hardware device 9 is provided with four of the interfering members 6.

Figure 6:
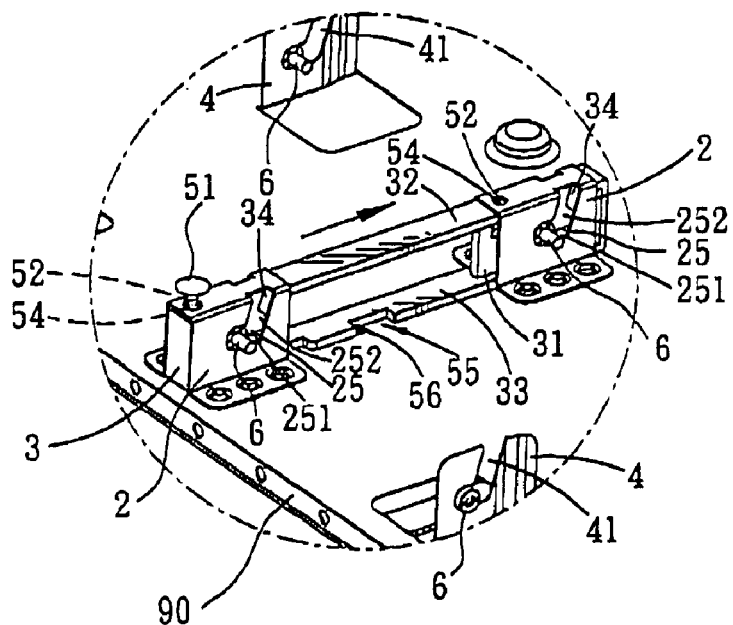
FIG. 6 is a fragmentary perspective view of the preferred embodiment, showing the second limiting member at a released position.

Referring to FIGS. 4 and 6, each of the first limiting members 2 is adapted to be secured onto the base plate 90, and includes two spaced-apart first upright walls 21, a first top wall 22 connected to top sides of the two first upright walls 21, and two base walls 23 extending respectively from bottom sides of the first upright walls 21 in a direction away from the first top wall 22. Each of the base walls 23 is provided with a plurality of through holes 24 for extension of screw fasteners (not shown) therethrough so as to lock the base wall 23 onto the base plate 90. Each of the first upright walls 21 is provided with a slot 25. Each slot 25 has a transverse segment 251 that is generally parallel to the base plate 90, and an oblique segment 252 that extends obliquely upward from one end of the transverse segment 251 to the top side of the respective first upright wall 21. Each slot 25 is disposed to allow a corresponding interfering member 6 to extend thereinto through an opening 253 of the oblique segment 252 in the first top wall 22, and to slide along the oblique segment 252 and the transverse segment 251.

The third limiting members 4 are provided on the base plate 90, two on either side of the first limiting members 2. Each of the third limiting members 4 corresponds to and is spaced apart from a respective first upright wall 21. A distance between each of the third limiting members 4 and the respective first upright wall 21 allows for mounting of a respective one of the computer hardware devices 9. Each of the third limiting members 4 is provided with a slot 41 corresponding to the slot 25 in the respective first upright wall 21 for sliding movement of a respective interfering member 6 provided on the respective computer hardware device 9 in the slot 41. In this embodiment, the third limiting members 4 are integrally formed with the base plate 90. The base plate 90 may be formed from metal or plastic, and is a part of a housing (shown in part only). The computer hardware devices 9 are to be secured in the housing.

Figure 8:
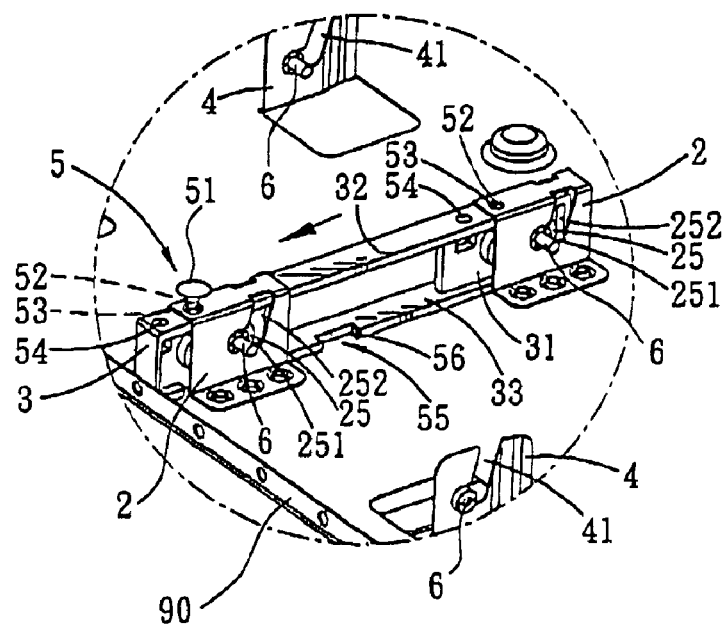
FIG. 8 is a fragmentary perspective view of the preferred embodiment to illustrate the second limiting member at a locking position.

The second limiting member 3 includes a second upright wall 31, a second top wall 32 connected to a top side of the second upright wall 31, and a bottom wall 33 connected to a bottom side of the second upright wall 31 and disposed proximate to the base plate 90. The second limiting member 3 is provided on the base plate 90, and is extended through the two first limiting members 2, with the first top walls 22 overlying the second top wall 32. In addition, the second limiting member 3 is movable relative to the first limiting members 2 between a locking position (as shown in FIG. 8) and a released position (as shown in FIG. 6). Referring once again to FIG. 4, the second limiting member 3 has four limiting grooves 34 provided in the second upright wall 31 and corresponding respectively to the slots 25 in the first limiting members 2. The limiting grooves 34 are symmetrically provided in two opposite sides of the second upright wall 31. Each of the limiting grooves 34 has an opening 341 formed in the second top wall 32. A wall surface 35 defining a respective one of the limiting grooves 34 has an oblique face 351 extending obliquely downward from the second top wall 32 and corresponding to the oblique segment 252 of the respective slot 25, and a curved face 352 connected to a bottom end of the oblique face 351.

The positioning mechanism 5 selectively secures the second positioning member 3 at the locking position or the released position, and includes two locking pins 51, two positioning holes 52 provided respectively in the first top walls 22 of the two first limiting members 2, and two locking holes 53 and two release holes 54 provided in the second top wall 32 of the second limiting member 3. Each of the positioning holes 52 corresponds to a respective locking hole 53 and a respective release hole 54, and the respective locking hole 53 and the respective release hole 54 lie in a straight line. Each of the locking pins 51 is used in conjunction with a socket 57. In addition, the positioning mechanism 5 further includes a limiting recess 55 provided in the bottom wall 33 of the second limiting member 3, and a stop element 56 (see FIGS. 3 and 7) provided on the base plate 90 and cooperating with the limiting recess 55. The limiting recess 55 has a first end 551 and a second end 552 disposed on two opposite sides of the stop element 56. The stop element 56 has a front side face 561 and a rear side face 562.

Figure 7:
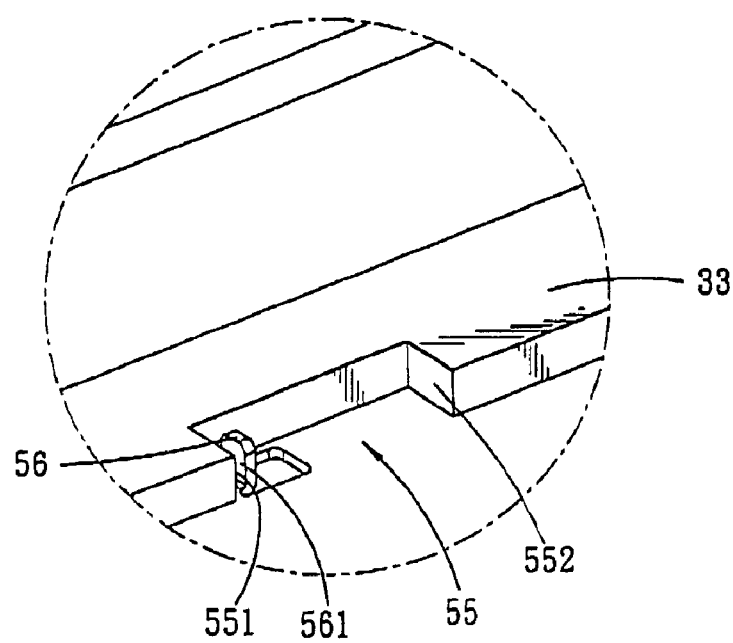
FIG. 7 is a fragmentary enlarged view of FIG. 6 to illustrate the positional relationship between the stop element and a limiting groove when the second limiting member is at the released position.

The present invention will now be further illustrated with reference to FIGS. 6 and 7. To facilitate description, only the interfering members 6 on the computer hardware devices 9 are depicted in FIG. 6. When the second limiting member 3 is pushed in a direction indicated by the arrow in FIG. 6 so that the part of the bottom wall 33 defining the limiting recess 55 abuts against the front side face 561 of the stop element 56, i.e., when the stop element 56 is located at the first end 551 of the limiting recess 55, the positioning holes 52 in the first limiting members 2 may be easily registered with the release holes 54 in the second limiting member 3, respectively. Thus, excess displacement of the second limiting member 3, which may result in difficulty in registering the positioning holes 52 with the release holes 54, can be prevented. By registering the positioning holes 52 with the release holes 54, respectively, and by extending the locking pins 51 into the corresponding positioning holes 52 and the corresponding release holes 54, the second limiting member 3 can be secured at the released position. When the second limiting member 3 is at the released position, the slots 25 are communicated with the corresponding limiting grooves 34 to enable the interfering members 6 to freely slide along the corresponding slots 25. If it is desired to remove the computer hardware devices 9, each of the interfering members 6 can be moved along the transverse segment 251 of the respective slot 25 toward the oblique segment 252 thereof and out of the respective slot 25. If it is desired to install the computer hardware devices 9, the interfering members 6 are moved along the corresponding slots 25 in the opposite direction.

Figure 9:
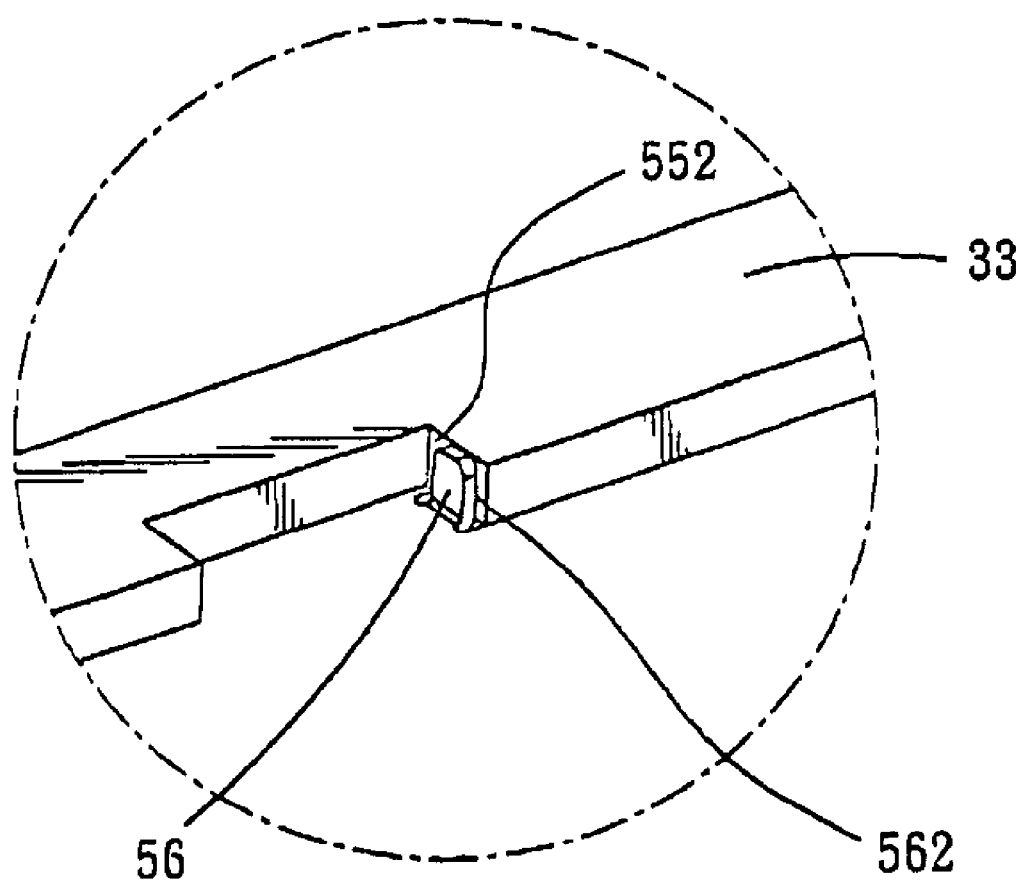
FIG. 9 is a fragmentary enlarged view of FIG. 8 to illustrate the positional relationship between the stop element and the limiting groove when the second limiting member is at the locking position.

Referring to FIGS. 8 and 9, when installing the computer hardware device 9, the interfering members 6 are respectively inserted into the slots 25, and the second limiting member 3 is subsequently pushed in a direction indicated by the arrow in FIG. 8, so that the part of the bottom wall 33 defining the limiting recess 55 abuts against the rear side face 562 of the stop element 56, i.e., when the stop element 56 is located at the second end 552 of the limiting recess 55, registration of the positioning holes 52 in the first limiting members 2 with the locking holes 53 in the second limiting member 3 is facilitated. Thus, excess displacement of the second limiting member 3, which may lead to difficulty in registering the positioning holes 52 with the locking holes 53, can be prevented. By registering the positioning holes 52 with the locking holes 53, respectively, and by extending the locking pins 51 through the corresponding positioning holes 52 and the corresponding locking holes 53, the second limiting member 3 can be secured at the locking position. When the second limiting member 3 is at the locking position, each of the slots 25 is merely partly communicated with the corresponding limiting groove 34, and the wall surface 35 defining the limiting groove 34 (i.e., the curved face 352 of the wall surface 35 shown in FIG. 4) abuts against the corresponding interfering member 6, and cooperates with the transverse segment 251 of the corresponding slot 25 to limit the corresponding interfering member 6. In other words, the oblique segment 252 of each of the slots 25 may be blocked by moving the second limiting member 3, and the interfering members 6 may be held in place by virtue of the arrangement of the first and second limiting members 2, 3 to thereby secure the computer hardware device 9 onto the base plate 90. If it is desired to remove the computer hardware device 9, the second limiting member 3 is moved to the released position in the manner as described hereinabove.

In this embodiment, the fixture mechanism 1 may be adapted for securing two computer hardware devices 9. However, depending on actual requirements in use, e.g., a housing with limited space, the fixture mechanism 1 may be used to secure only one computer hardware device 9. In this case, the first and second limiting members 2, 3 need to be modified by omitting the first upright wall 21 and the base wall 23 on one side of each of the first limiting members 2, and by also omitting the two limiting grooves 34 in one side of the second limiting member 3, and are used in conjunction with two third limiting members 4, so as to save space. Certainly, if the computer hardware device 9 is of a smaller size, the fixture mechanism 1 may include only one first limiting member 2, and the first limiting member 2 may have only one first upright wall 21 and one slot 25. Correspondingly, the second limiting member 3 is provided with one limiting groove 34, one locking hole 53, and one release hole 54, and is used in conjunction with only one third limiting member 4. Furthermore, the manner of modifying the first limiting members 2 and the second limiting member 3 should not be limited to those disclosed herein.

In sum, in the fixture mechanism 1 according to the present invention, through the arrangement of the slots 25 in the first limiting members 2 and the limiting grooves 34 in the second limiting member 3, the interfering members 6 secured on the computer hardware devices 9 are slidable along the slots 25 and the limiting grooves 34 when the second limiting member 3 is at the released position, and the slots 25 may be partly blocked to permit clamping and fixing of the interfering members 6 by the first and second limiting members 2, 3 when the second limiting member 3 is held at the locking position, thereby securing the computer hardware devices 9. Thus, the computer hardware devices 9 can be quickly fixed in position when being assembled to the housing, and the interfering members 6 on the computer hardware devices 9 do not have to be loosened when disassembling the computer hardware devices 9 from the housing. Work efficiency is therefore enhanced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A fixture mechanism adapted to secure a computer hardware device onto a base plate, said fixture mechanism comprising:
a first limiting member adapted to be secured onto the base plate, and including a first upright wall with top and bottom sides, and a slot provided in said first upright wall, said slot having a transverse segment that is to be disposed generally parallel to the base plate, and an oblique segment extending obliquely upward from one end of said transverse segment to said top side of said first upright wall;
a second limiting member adapted to be disposed on the base plate, said second limiting member being movable relative to said first limiting member between a locking position and a released position, and having a wall surface defining a limiting groove which cooperates with said slot;
a positioning mechanism for selectively securing said second limiting member at one of the locking position and the released position, said positioning mechanism including a locking pin, a positioning hole provided in said first limiting member, and a locking hole and a release hole provided in said second limiting member, said positioning hole being registrable with said locking hole to permit extension of said locking pin through said positioning hole and said locking hole so as to secure said second limiting member at the locking position, said positioning hole being registrable with said release hole to permit extension of said locking pin through said positioning hole and said release hole so as to secure said second limiting member at the released position; and
an interfering member adapted to be disposed on the computer hardware device, said interfering member being extendible through said slot and being slidable along said oblique segment and said transverse segment;
said slot being communicated with said limiting groove to permit free sliding movement of said interfering member along said slot when said second limiting member is at the released position;
said slot being partly communicated with said limiting groove, and said wall surface which defines said limiting groove abutting against said interfering member and cooperating with said transverse segment of said slot to limit said interfering member when said second limiting member is at the locking position.

2. The fixture mechanism according to claim 1, further comprising: a third limiting member that corresponds to said first limiting member, and that is adapted to be disposed on the base plate and spaced apart from said first limiting member, said third limiting member being provided with a slot corresponding to said slot in said first limiting member; and one other interfering member that is adapted to be disposed on the computer hardware device and that is slidable along said slot in said third limiting member.

3. The fixture mechanism according to claim 1, wherein said first limiting member further includes a first top wall extending transversely from said top side of said first upright wall, said positioning hole being provided in said first top wall; and wherein said second limiting member includes a second upright wall with a top side, and a second top wall connected to said top side of said second upright wall, said limiting groove being provided in said second upright wall and having an opening formed in said second top wall, said locking hole and said release hole being provided in said second top wall and being spaced apart from each other, said first top wall overlying said second top wall.

4. The fixture mechanism according to claim 3, wherein said second limiting member further includes a bottom wall adapted to be disposed proximate to the base plate, said positioning mechanism further including a limiting recess provided in said bottom wall, and a stop element adapted to be disposed on the base plate and cooperating with said limiting recess, said limiting recess having first and second ends that are located respectively at two opposite sides of said stop element, said positioning hole and said release hole being registered with each other when said stop element is located at said first end of said limiting recess, said positioning hole and said locking hole being registered with each other when said stop element is located at said second end of said limiting recess.

5. The fixture mechanism according to claim 2, wherein said third limiting member is adapted to be integrally formed with the base plate.

6. The fixture mechanism according to claim 3, wherein said first limiting member further includes a base wall extending from said bottom side of said first upright wall in a direction away from said first top wall, said base wall being adapted to be secured onto the base plate.

7. The fixture mechanism according to claim 3, wherein said wall surface of said second limiting member which defines said limiting groove has an oblique face extending obliquely downward from said second top wall and corresponding to said oblique segment of said slot, and a curved face connected to a bottom end of said oblique face.

8. The fixture mechanism according to claim 1, wherein said interfering member is a screw.

* * * * *